(12) United States Patent
Thompson (10) Patent No.: US 10,410,078 B2
(45) Date of Patent: Sep. 10, 2019

(54) METHOD OF PROCESSING IMAGES AND APPARATUS

(75) Inventor: Martin John Thompson, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 122 days.

(21) Appl. No.: 13/981,795

(22) PCT Filed: Jan. 24, 2012

(86) PCT No.: PCT/GB2012/050143
§ 371 (c)(1),
(2), (4) Date: Sep. 9, 2013

(87) PCT Pub. No.: WO2012/101430
PCT Pub. Date: Aug. 2, 2012

(65) Prior Publication Data
US 2013/0342698 A1   Dec. 26, 2013

(30) Foreign Application Priority Data
Jan. 25, 2011 (GB) .................................. 1101237.4

(51) Int. Cl.
*G06K 9/20* (2006.01)
*G06K 9/00* (2006.01)

(52) U.S. Cl.
CPC ....... *G06K 9/2018* (2013.01); *G06K 9/00798* (2013.01)

(58) Field of Classification Search
CPC ........... G06K 9/00791; G06K 9/00798; G06K 9/2018
(Continued)

(56) References Cited

U.S. PATENT DOCUMENTS

| 7,151,996 B2 | 12/2006 | Stein | |
| 2003/0040864 A1* | 2/2003 | Stein | ................... G05D 1/0246 701/400 |

(Continued)

FOREIGN PATENT DOCUMENTS

| EP | 1130544 A1 | 9/2001 |
| EP | 1909230 A1 | 4/2008 |
| EP | 1914700 A1 | 4/2009 |

OTHER PUBLICATIONS

Chinese First Office Action, Application No. 201280006404.0 dated May 5, 2016.
(Continued)

*Primary Examiner* — Mainul Hasan
(74) *Attorney, Agent, or Firm* — MacMillan, Sobanski & Todd, LLC (57) ABSTRACT

A method of processing an image includes a region of a highway in front of the vehicle captured using an imager having a two dimensional array of image capturing pixels. The array includes a first set of pixels substantially independent of hue and a second set of pixels dependent of a limited range of hues. The method further includes the steps of producing a first image where each pixel is assigned a value derived from the first set of pixels and producing a second image where each pixel is assigned a value derived from the first set of pixels and the second set of pixels. The method includes identifying-for at least one pixel in the first image a first intensity change value indicative of the difference between that pixel and at least one adjacent pixel identifying for a corresponding pixel in the second image a second intensity change value indicative of the difference between that pixel and at least one adjacent pixel. A combined image is formed using a defined set of combination rules to assign a value to the corresponding pixel in the (Continued)

combined image which depends on the first and second identified intensity change values for that corresponding pixel.

21 Claims, 5 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2008/0043099 | A1* | 2/2008 | Stein | B60Q 1/143 |
| | | | | 348/118 |
| 2008/0279476 | A1* | 11/2008 | Rongen | A61B 6/12 |
| | | | | 382/284 |
| 2009/0123065 | A1* | 5/2009 | Kobayashi | G06K 9/00798 |
| | | | | 382/165 |
| 2009/0278954 | A1* | 11/2009 | Kanamori | H04N 9/045 |
| | | | | 348/222.1 |
| 2010/0172542 | A1* | 7/2010 | Stein | G06K 9/00798 |
| | | | | 382/103 |

OTHER PUBLICATIONS

Fischer R.B. et al: "Dictionary of a Computer Vision and Image Processing". 2005, John Wiley and Sons, XP002679406, p. 140, col. 1, last paragraph; and p. 229, last paragraph, col. 2.
Search Report under Section 17 for GB1101237.4 dated May 19, 2011.
International Search Report for PCT/GB2012/050143 dated Jul. 17, 2012.

* cited by examiner

METHOD OF PROCESSING IMAGES AND APPARATUS

CROSS-REFERENCE TO RELATED APPLICATIONS

This application is a national stage of International Application No. PCT/GB2012/050143 filed Jan. 24, 2012, which claims priority to Great Britain Patent Application No. GB 1101237.4, filed Jan. 25, 2011, the disclosures of which are incorporated herein by reference in their entirety.

BACKGROUND OF THE INVENTION

This invention relates to improvements in methods of image processing, in particular the processing of images as part of a lane detection apparatus or road profile prediction method and apparatus.

It is known to use a simple video camera to capture an image of a region of highway ahead of a vehicle. The camera comprises a two dimensional grid of detector pixels, each of which produces an output signal whose value is dependent on the intensity of the light falling on the pixel during a sampling period. The image output from the array is therefore a grey-scale image. It is then known to process the image to identify lane boundary markings, and from this determine the route of the highway. A suitable method of identifying the markings is taught in EP 1 057 141 B 1.

The applicant has appreciated that this works well in many countries, such as the UK, where the lane boundaries are marked by high contrast white lines on a dark coloured road surface. The white line is much lighter in colour than the road surface, and this shows up well in the grey scale image, making it relatively simple to detect lane boundaries. However, the applicant has appreciated that this does not work well when the lane boundary markings are not white. For instance, in Korea it is common to use yellow and blue markings for lane boundaries. When imaged using a grey scale imager, the lane boundaries are often indistinguishable from the road surface. The marking and road typically have the same, or very similar, lightness when considered in grey scale.

BRIEF SUMMARY OF THE INVENTION

According to a first aspect, the invention provides a method of processing an image for use in a lane detection apparatus suitable for being fitted to a vehicle, the method comprising:
capturing an initial image of a region of a highway in front of the vehicle using an imager having a two dimensional array of image capturing pixels, the array comprising a first set of pixels located at spaced coordinates (XY) which each produce an output signal whose value is substantially independent of the hue of the corresponding portion of the scene captured in the image and a second set of pixels located at spaced locations which each produce an output signal having a value dependent on a limited range of hue(s) of the corresponding portion of the scene captured in the image and partially dependent on the lightness of the corresponding portion of the scene captured in the image,
producing from the initial captured image a first image where each pixel in the first image is assigned a value derived using values from at least one pixel in the first set of pixels only,
producing from the initial image a second image where each pixel in the second image is assigned a value that is derived using values from at least one pixel in the first set of pixels and at least one pixel in the second set of pixels,
identifying for at least one pixel in the first image a first intensity change value indicative of the difference between the value assigned to that pixel and the value assigned to at least one adjacent pixel,
identifying for a corresponding pixel in the second image a second intensity change value indicative of the difference between the value assigned to that pixel and the value assigned to at least one adjacent pixel, and
forming a combined image by using a defined set of combination rules to assign a value to the corresponding pixel in the combined image which depends on the magnitude and/or sign of each of the first and second identified intensity change values for that corresponding pixel in the first and second images, the combined image being suitable for use in the lane detection apparatus.

The second set of pixels may produce an output whose value is dependent on the amount of a limited range of hues limited to a single dominant hue that is present in a corresponding portion of the scene. This is most preferably a predominantly red hue and can be achieved by placing a red filter over those pixels or in any other manner.

Of course, the pixels of the second set may respond preferentially to other dominant hues, for example red or blue or green or yellow or, to a limited range comprising of a collection of hues such as red and green, or even to "hues" outside of the visible spectrum, for example in the infra-red region.

The first set of pixels in which a value is produced independent of a dominant hue will most preferably have a value which is dependent on the lightness of the corresponding portion of the image and not on the range of hues. For instance, the value may be high if the corresponding portion of the scene is light, and low if it is dark. These pixels will produce ideally a greyscale image. The first image may be formed using only the values from these first set of pixels. The greyscale image may be across the full (not limited) range which includes the hues seen by the second pixels, e.g. across the wide visible or infra-red band.

Each set of pixels may comprise many pixels, but a set may comprise as few as one pixel in some embodiments. The more pixels, the higher the resolution with which the image can be produced and accordingly the finer the detail within the scene that can be analysed. A set with only one pixel, which is exposed sequentially to different portions of a scene to build up an image of the whole scene could be provided within the scope of the present invention, perhaps using a moving lens or shutter between the pixel and scene to change the portion of scene imaged at any given time.

The step of producing the second image may comprise the steps of generating an intermediate image in which the value assigned to each pixel is obtained using the output from at least one pixel of the second set and independent of the values of the pixels the first set, and subtracting the corresponding value assigned to the first image from the value assigned to the intermediate image to form the values of the second image.

The method may include a step of scaling the values assigned to pixels in each of the first (greyscale) image and the intermediate, (red or other hue or range of hues), image prior to combining them to produce the second (hue) image. The step of scaling may comprise increasing the values corresponding to each pixel in the intermediate image. This recognises the reduction in light reaching the pixels which are only sensitive to a limited range of hues (such as red) due to the filtering that may be needed to apply, preferentially, to pass only that hue or limited range of hues.

This scaling step is useful for ensuring that both images are given the correct weighting when used to produce the hue image. The scaling may be arranged such that both the first, greyscale, image, has values bounded at 0 and N (where N may be 255 or some other value), the red image bounded at 0 and N and the hue image bounded at −N and +N. In the case of a red image, +255 may correspond to the presence of red through to yellow as the dominant hue and little or no blue, and −255 as the presence of blue through to cyan and little or no red as the dominant hue.

The method may comprise using an imager may comprise a single two dimensional array of imaging pixels.

Using a set of rules to combine the images allows the dominant edge features of a first image of a scene, which is grayscale, and the dominant edge features of a second image of the hue of the same scene to be used to ensure that both white lane boundaries and non-white lane boundaries (such as yellow) are highlighted in the combined image. This increases the likelihood of the boundaries being detected during the subsequent image processing of the combined image to detect lane boundaries. The first image insensitive to hue detects changes in the lightness of portions of the image and so is good at identifying light lines on a dark background, even where they have the same hue. The second image can detect lines which are of a different hue to adjacent portions of highway even if they are the same lightness, such as a yellow line on a grey road. If an edge is not detected in the greyscale image but is detected in the pseudo-hue image, it will be present in the combined image, and vice versa.

The method may comprise identifying changes in intensity present in each of the first and second images by using a standard edge detection technique, for example using a Sobel edge-detection algorithm. It may comprise comparing the value of the pixel in an image with the value of at least one immediately adjacent pixel in that same image. It may be a pixel which is adjacent in the horizontal (X) or vertical (Y) planes.

Most preferably the method may use edge detection which comprises scanning across a horizontal row of values in the array corresponding to a row of pixels, and comparing the value assigned to each pixel with that of the preceding, or following, pixel in the row. An intermediate image in which each pixel is assigned a value dependent on the difference may be formed.

The skilled person will understand that the first, intermediate, second and combined images will, of course, not be physical images any more than any other "image" such as a digital photograph stored in an electronic memory is a physical image. They will generally comprise only a stored array of numerical or alphanumerical values in which each value is assigned to a pixel in the respective first and second images and hence corresponds to a portion of the scene captured in the initial image. These images may be stored very temporarily, and indeed at any one time only one value or row of values, of the intermediate images may be stored. As long as they are stored at the same time as the corresponding value of the other images long enough for them to be combined as required by the method to form the final combined image the method will still work.

The defined set of rules employed in the step of forming the combined image may comprise comparing the two intensity change values obtained from the first and second images for each pixel and selecting the value with the largest magnitude and assigning the value of that pixel (maintaining its sign) to the corresponding pixel of the combined image. Other rules could be used. For instance, each intensity change value may be squared and added to the other to form the magnitude of the value of the combined image, and a sign may be applied which depends on which of the two intensity change values has the highest magnitude.

From this combined image standard image processing of the edge-enhanced combine image can be applied. The method may comprise processing the combined image to identify the boundaries of a highway. This may use the methodology described in EP 1 057 141 B 1 which is incorporated herein by reference.

The method may produce a combined image comprising values for each of the pixels in the initial image.

The step of forming the first image may comprise assigning values to each pixel which correspond to the value in the initial image where it is a pixel of the first set, and for the pixels which are in the second set assigning values which are obtained by interpolation from the values of one or more of the adjacent pixels of the first set. The method therefore picks out all the values from the first set of pixels and fills in the gaps using interpolation.

The same or a similar interpolation step can be used to form the intermediate (red) image, picking out only values for the second set of pixels and interpolating to fill any gaps.

According to a second aspect the invention provides an image processing apparatus for a vehicle comprising:

An imager arranged to capture an initial image of a region of a highway in front of the vehicle, the imager comprising a two dimensional array of image capturing pixels, the array comprising a first set of pixels located at spaced coordinates (XY) which each produce an output signal whose value is substantially independent of the hue of the corresponding portion of the scene captured in the image interspersed with a second set of pixels which each produce an output signal having a value dependent on a limited range of hues of the corresponding portion of the scene captured in the image and partially dependent on the lightness of the corresponding portion of the scene captured in the image, and a processing means which comprises:

first processing means adapted to produce from the initial captured image a first image which is substantially independent of hue in the scene where each pixel in the first image is assigned a value derived using values from at least one pixel in the first set of pixels, Second processing means which is adapted to produce from the initial image a second image where each pixel in the second image is assigned a value that is derived using values from at least one pixel in both of the first and second sets of pixels, First Identifying means for identifying for at least one pixel in the first image a first intensity change value indicative of the difference between the value assigned to that pixel and the value assigned to at least one adjacent pixel, Second Identifying for identifying a corresponding pixel in the second image a second intensity change value indicative of the difference between the value assigned to that pixel and the value assigned to at least one adjacent pixel, and a combining means for forming a combined image by using a defined set of combination rules to assign a value to the corresponding pixel in the combined image which depends on the magnitude and/or sign of each of the first and second identified intensity change values for that corresponding pixel in the first and second images, the combined image being suitable for use in the lane detection apparatus.

The imager may be fixed to the vehicle and arranged to capture a series of images, each of which is processed to produce a respective series of combined images.

The apparatus may include a storage means, typically an area of electronic memory, within which the images or portions thereof are stored temporarily.

The processing means may be arranged to carry out any of the method steps of the first aspect of the invention.

The imager may comprise a video camera, which may produce a stream of initial images, each of which is processed to form a respective stream of combined images.

The video camera may comprise a CCD array. The array may comprise an array of detecting elements, with the pixels of the second set being covered by a filter to give them the required sensitivity to hue(s). The filter may be a red filter. The pixels of the first set may be covered by a clear filter.

The first pixels and second set of pixels may be arranged in a checker pattern, comprising horizontal and vertical rows, with each row comprising alternating pixels of the first and second set. Alternatively, there may be fewer pixels in one set than the other. For example, a second pixel or first pixel may be spaced from an adjacent pixel second pixel or first pixel by more than one pixel.

According to a third aspect the invention provides a road profile prediction apparatus for a vehicle comprising an apparatus according to the second aspect and a further processing means which is arranged to identify lane boundaries from the combined image output from the apparatus and from the lane boundaries predict the profile of the road ahead of the vehicle.

According to a fourth aspect the invention provides a method of lane detection including the steps of the first aspect of the invention and the further step of processing the combined image to detect lane boundaries within the image. This step may comprise a step of detecting lane boundaries based on the change of intensity in the combined image between adjacent pixels. An edge detection algorithm may be used to process the combined image.

The processing means of the second and third aspects may comprise a digital signal processor. A program may be provided, which is stored in an area of memory which when running on the processor causes the steps of the method of the first aspect of the invention to be carried out.

Other advantages of this invention will become apparent to those skilled in the art from the following detailed description of the preferred embodiments, when read in light of the accompanying drawings.

DETAILED DESCRIPTION OF THE INVENTION

Figure 1:
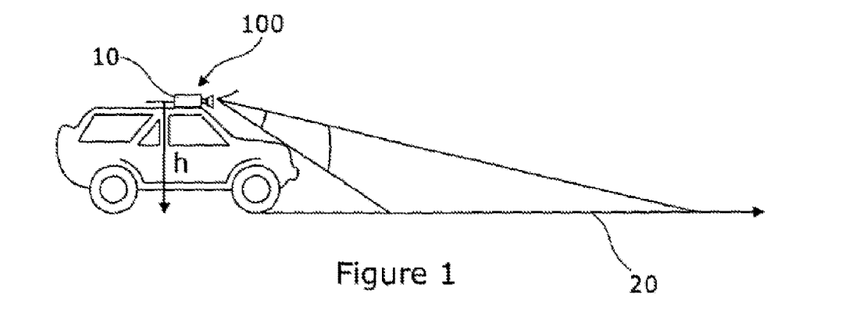
FIG. 1 is a view of a vehicle fitted with an embodiment of a road profile prediction apparatus according to an aspect of the invention.

As shown in FIG. 1, a vehicle 100 is fitted with an exemplary road profile prediction apparatus 10 according to an aspect of the invention. This apparatus includes an imager, typically a video camera, which outputs frames of images continuously to a processor. The camera is located at a height H above the road 20, and captures a scene ahead of the vehicle. The processor carries out a method of processing the images which enables edges to be detected, and from those the road profile is predicted. In particular, a prediction of the lane boundaries is made based on detection of road markings in the image. The skilled person will readily understand how this can be achieved in general terms from the teachings of EP 1 057 141 B 1. A detailed explanation of how the edges are detected from a suitable image will therefore not be repeated herein, it being understood that provided the skilled person is provided with an initial image to be processed the edges can be identified and the lane boundaries predicted.

Figure 2:
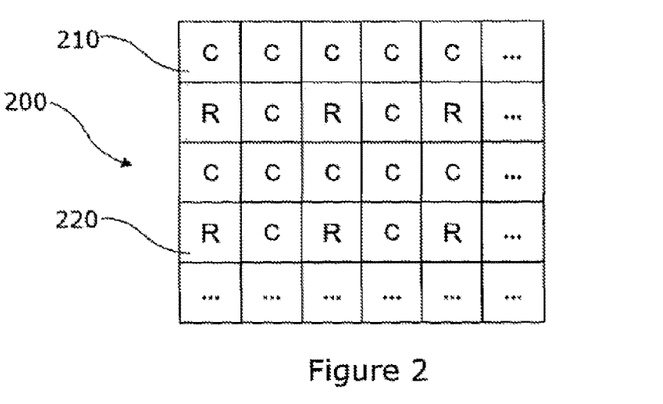
FIG. 2 is a representation of the pattern of first and second pixels defined by clear and red filters of the CCD array of the apparatus.

The camera may have many forms but in this embodiment it comprises a complementary metal-oxide semiconductor (CMOS) imaging circuit having a two dimensional array 200 of pixels, arranged in horizontal and vertical rows. This is covered with a filter layer as shown in FIG. 2. The array is a 6 by 6 array but in reality a much larger array, say 500 by 500 or larger, will be used. The operation of CMOS arrays is well known, and again will not be repeated here. Generally the value output from each pixel in a frame corresponds to the overall intensity of light that falls upon the responsive part of the pixel during a sampling period. The more light that falls upon it, the more charge is built up and the higher the output value for the pixel.

The imaging array in the embodiment includes a first set of pixels which receive light from the scene directly and so produce an output indicative of the intensity of a corresponding portion the scene that is captured. These are covered with a clear filter 210 marked C in FIG. 2. The lighter the portion of the scene the higher the value, ranging from 0 for a totally dark portion to N for a portion which is light enough to saturate the pixel, where N in this example is 255.

Mixed in with the first set of pixels, in a checkerboard fashion are a second set of pixels which are sensitive to a dominant hue or limited range of hues. In the context of this application, they are said to produce an output value indicative of the presence of a limited range of hues of the portion of the scene. As shown in FIG. 2, these are arranged in a grid, separated in all directions from similar pixels sensitive to the dominant hue by one pixel of the first set. To make the pixels sensitive to a dominant hue they are covered by a red filter 220, marked R in FIG. 2, which preferentially allows light with a red hue to pass through to the pixel. If a portion of a scene has no red hue at all, a value of 0 will be output, and if it is entirely red in hue and sufficiently light a value of around 255 will be produced.

For each initial image, or frame, the value produced for each pixel is stored in an area of electronic memory for processing. This array of values in the context of this text is called an initial image, although it will be understood that it is simply an array of values and cannot be seen by a human eye unless used to create an image on a display. Indeed, in practice at any one time only a portion of the image may be stored in the memory, with any portions which have been processed being overwritten.

Figure 7:
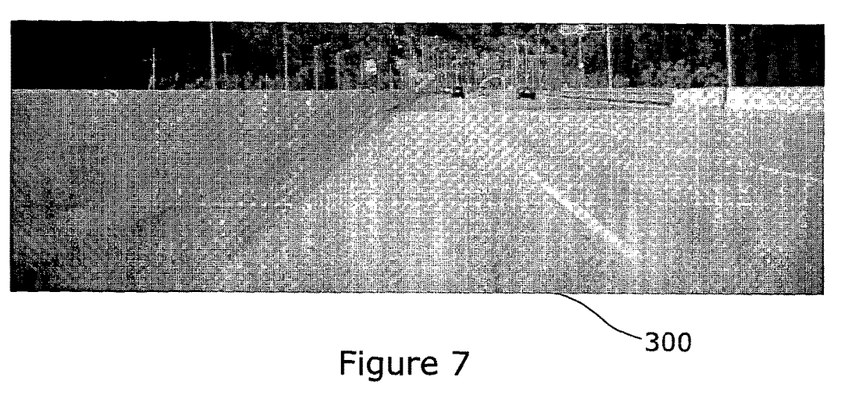
FIG. 7 is a representative initial image of a scene ahead of vehicle captured using the apparatus of FIG. 1.

FIG. 7 shows the initial image 300, which has a speckle pattern corresponding to the red filtered pixels.

Unlike the apparatus taught in EP1 057 141 B 1, in which the initial image is next processed to identify lane boundaries, the embodiment shown performs additional processing of the initial image which increases the ability of the system to detect lane boundaries which have the same lightness as the adjacent road. This is the case in particular with yellow lane markings, which to the naked eye are easy to identify as drivers have full colour vision, but which are often all but invisible in an image captured by a grey-scale camera.

Figure 3:
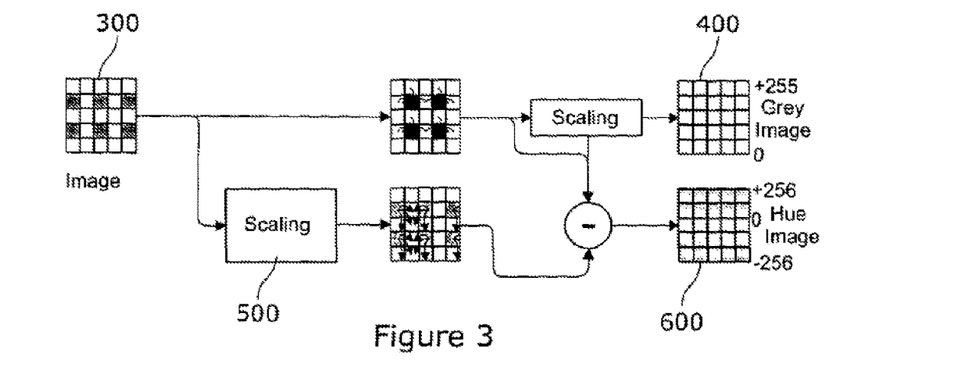
FIG. 3 is a flow diagram showing the steps performed by the apparatus to generate first and second images prior to predicting the road profile.
Figure 4A:
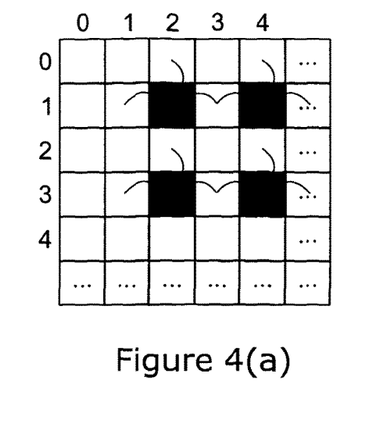
FIG. 4(a) is a schematic showing the interpolation of gaps used in the formation of the first image and (b) gaps in the second image.

In a first step, shown in FIG. 3, the initial image 300 is processed by the processor to form a first greyscale image 400 using only the values of the pixels which are sensitive to lightness and not the values sensitive to the hue. Where an actual value is present in the initial image, this is simply copied across to the corresponding pixel in the first image. Where there is a gap, because a pixel in the initial image is red filtered then the adjacent values that are copied across are interpolated to provide estimated values that fill the gaps. This is shown in FIG. 4(a) by arrows which indicate which surrounding pixels are used in the interpolation process. Of course, more or less surrounding pixels could be used.

Figure 8:
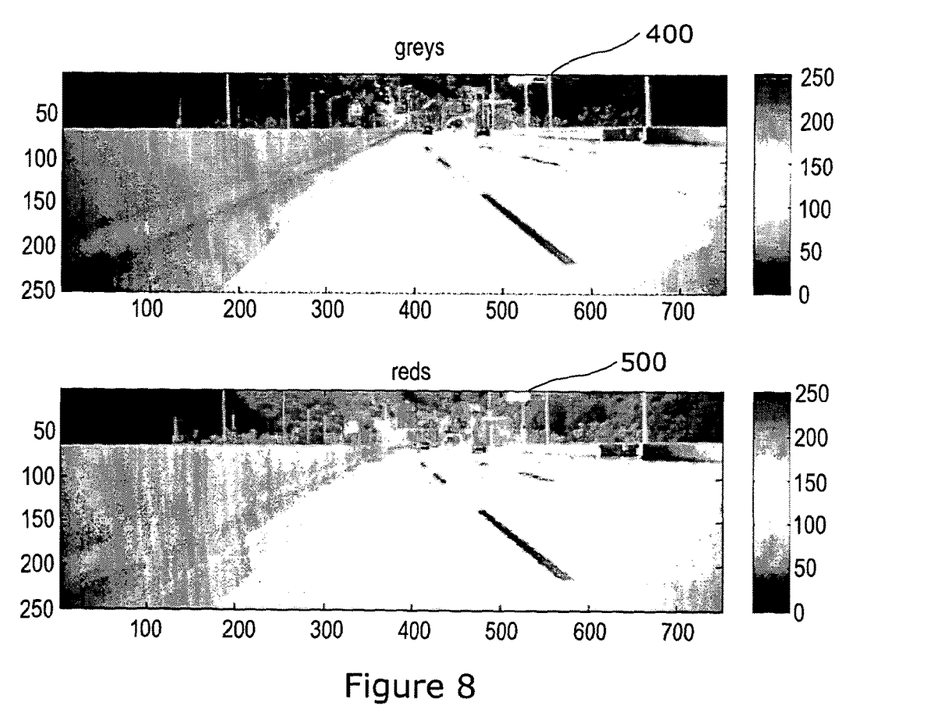
FIG. 8(a) is a representative first (greyscale) image.
FIG. 8(b) is a representative intermediate (red) image corresponding to the initial image of FIG. 7.

The result is a first image 400 that is an estimate of the image that would be produced if the CCD array only had pixels that are sensitive to lightness rather than hue. This first image is effectively a grey scale image of the scene. This is shown in FIG. 8(a) where it can be seen that the speckle of FIG. 7 is no longer present as the red pixels have been replaced with estimated values. Other more complex interpolation schemes could also be used (for example using pixels above and below the red pixels), or including the red pixels in some way to estimate the lightness of the image.

Figure 4B:
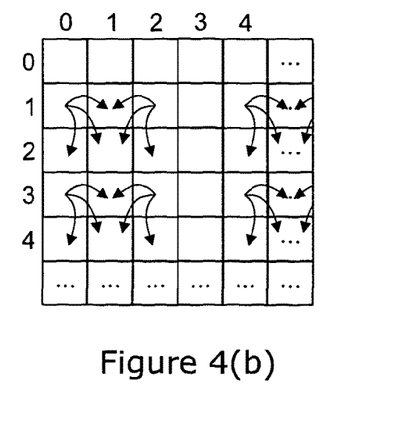

In a second step, a second image 600 is produced which is dependent on hue using the values of both the first and the second set of pixels. To do this, an intermediate red image 500 is produced using only the values in the initial image that correspond to the pixels with the red filter applied. Again, where values are present in the original image they are copied across to the second image. Where there are gaps the gaps are filled by interpolating adjacent values to provide an estimate of the hue of the portion of the scene corresponding to the gap. This is shown in FIG. 4(b). The intermediate red image 500 is effectively an image of the amount of the dominant hue, in this case red, present in each portion of the scene. This is shown in FIG. 8(b) of the drawings. Again more complex interpolations could be used.

Figure 9:
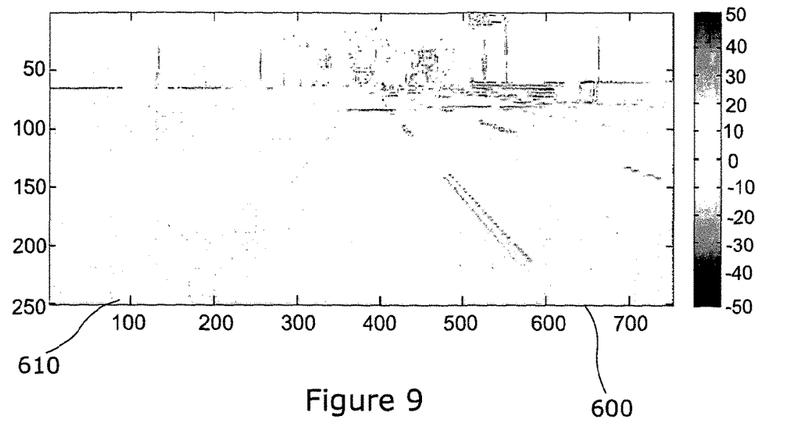
FIG. 9 is a second, hue, image produced from the first image and intermediate images.

The intermediate red image 500 is then combined with the first image to produce the hue image 600. This is shown in FIG. 9 of the drawings. To do this, a value is assigned to each pixel in the hue image corresponding to the value of the red image subtracted from the value of the first (lightness) image. As can be seen from FIG. 9, the value ranges from a maximum of +255 to a low of −255. Where there is a lot of red and the scene is relatively dark, a high value will be assigned as this indicates that there is little of any hue other than red. If there is a red but much more lightness overall, the value will be close to 0, as this indicates that other hues in addition to red are present. If the portion of the scene is quite light and there is little red in the red image the value will be very low, say −255. Thus, the value in the image gives an estimate of a pseudo-hue, with 255 being red/yellow, 0 dark and intermediate and −255 blue/cyan.

In a next step, the first (greyscale) and second (pseudo-hue) images 400, 600 are combined to produce an image 700 which can be passed to the road profile prediction stage. To produce this combined image 700, each of the images 400, 500 is passed through an edge detector that detects the presence of edges in the images. For each pixel, the processor applies an algorithm or some logical process to determine the value of the combined image from the respective outputs of the edge detector for each image.

Figure 5:
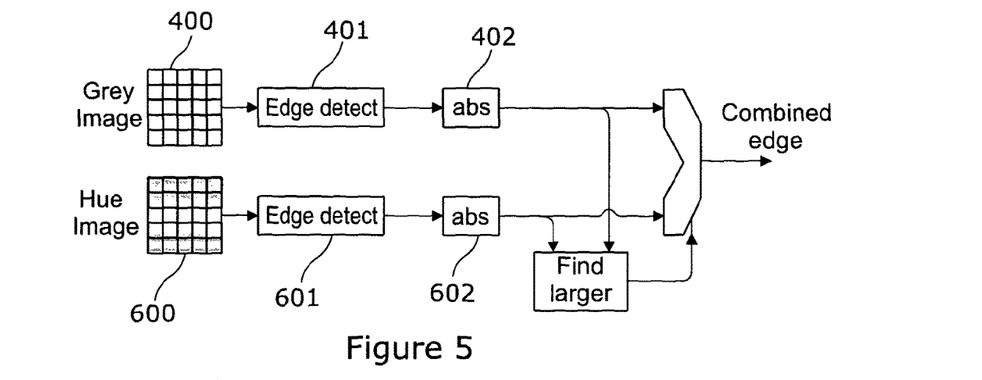
FIG. 5 is a schematic showing the steps used in producing a combined edge image to be used in predicting the road profile.

Specifically, as shown in FIG. 5, each pixel in the first and second images is processed in turn to identify the change in value of the pixel relative to at least one adjacent pixel by passing them through a respective edge detector 401, 601. A high change in value (a large difference) suggests the presence of part of an edge in an image. The absolute value 402, 602 is determined in each case and the largest of the two absolute change values is then used to allocate a value to the corresponding pixel in the combined image. This is repeated for all pixels to build up a complete combined image of the scene to produce the image shown in FIG. 10.

Figure 6:
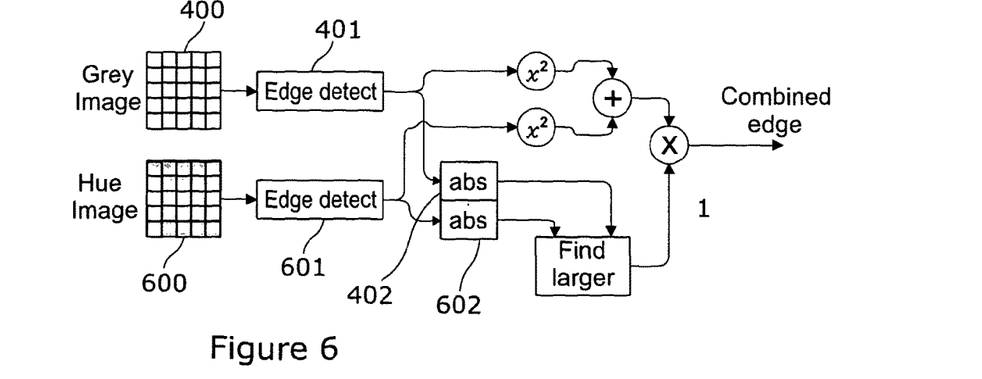
FIG. 6 is a schematic of a set of alternative steps which may be used to produce a combined image.

In an alternative embodiment, illustrated in FIG. 6 of the drawings, the change in value of each pixel in the first and third images is similarly determined using edge detectors 401,601, and from this the absolute value 402,602 of each change is also derived in a similar manner. The squares of the combined value from each image are then calculated and combined by addition to produce the value for the combined image, and this calculated value has a sign applied to it that is dependent on which of the absolute values has the larger magnitude. For instance, if the change value from the first image is the larger then the value assigned to that pixel in the combined image has a positive sign, and if it is smaller it has a negative sign. The absolute value is provided from the output of the addition. This technique treats the images as orthogonal components and calculates the "magnitude of the edge response".

Figure 10:
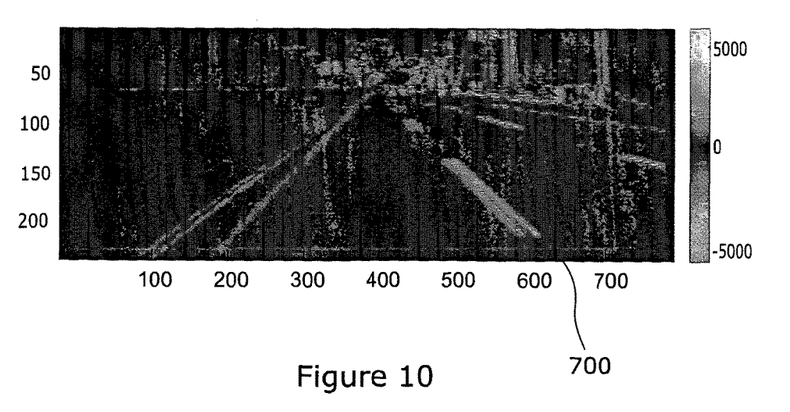
FIG. 10 is a combined edge image produced from the greyscale and hue images.
Figure 11:
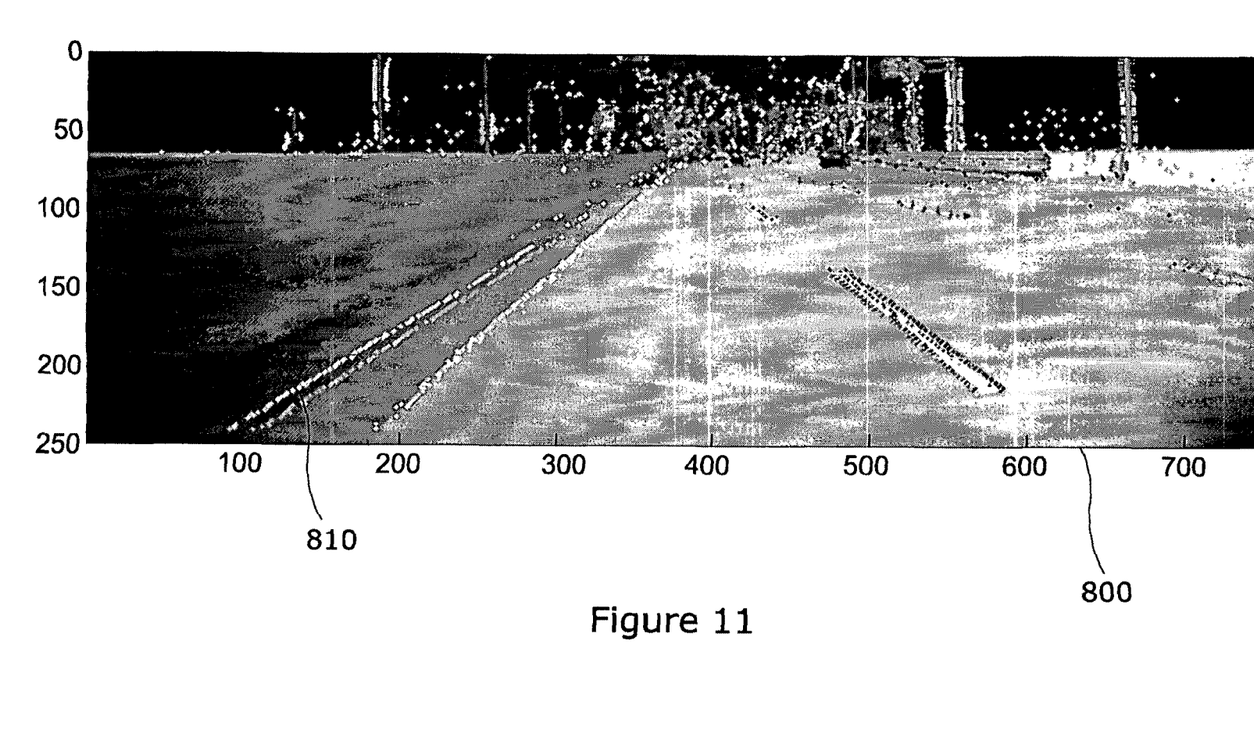
FIG. 11 shows the result of lane detection applied to the combined image.

Finally, the combined image as shown in FIG. 10 can be processed to identify lane boundaries using a standard technique such as that taught in EP 1 057 141 B1. The result may be the image 800 shown in FIG. 11. Here it can be clearly seen that a lane boundary 810 on the far left, which is painted in yellow, has been identified. This is almost impossible to identify in the initial image, but has been picked out in the hue image as line 610.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of processing an image for use in a lane detection apparatus suitable for being fitted to a vehicle, the method comprising the steps of:
   capturing an initial image of a region of a highway in front of the vehicle using an imager having a two dimensional array of image capturing pixels, the array comprising a first set of pixels located at spaced coordinates which each produce an output signal whose value is dependent on the lightness and not on the range of hues of the corresponding portion of the scene captured in the initial image interspersed with a second set of pixels located at spaced locations which each produce an output signal having a value dependent on a limited range of hues of the corresponding portion of the scene captured in the initial image and dependent on the lightness of the corresponding portion of the scene captured in the initial image, producing from the initial image a first image where each pixel in the first image is assigned a value derived using values from at least one pixel in the first set of pixels, producing from the initial image a second image, in which the step of producing the second image comprises the steps of:

(a) generating an intermediate image in which the value assigned to each pixel is obtained using the output from at least one pixel of the second set and independent of the values of the pixels of the first set, and (b) subtracting one of the corresponding value assigned to the first image and the value assigned to the intermediate image from the other one of those two values to form the values of the second image, wherein the first image, the second image, and the intermediate image are all derived from the initial image, identifying for at least one pixel in the first image a first intensity change value indicative of the difference between the value assigned to that pixel and the value assigned to at least one adjacent pixel, identifying for a corresponding pixel in the second image a second intensity change value indicative of the difference between the value assigned to that pixel and the value assigned to at least one adjacent pixel, and forming a combined image by using a defined set of combination rules to assign a value to the corresponding pixel in the combined image which depends on the magnitude or the magnitude and sign of each of the first and second identified intensity change values for that corresponding pixel in the first and second images, the combined image being suitable for use in the lane detection apparatus.

2. A method according to claim 1 in which each of the pixels of the second set of pixels produce an output whose value is dependent on the amount of a single dominant hue that is present in a corresponding portion of the scene.

3. A method according to claim 2 in which the dominant hue is red.

4. A method according to claim 1 which includes a step of scaling the values assigned to pixels in each of the first image and the intermediate image prior to combining them to produce the second image.

5. A method according to claim 1 which further comprises using an imager which comprises a single two dimensional array of imaging pixels.

6. A method according to claim 1 which comprises identifying changes in intensity present in each of the first and second images by comparing the value of the pixel in an image with the value of at least one immediately adjacent pixel in that same image.

7. A method according to claim 6 which comprises scanning across a horizontal row of values in the array corresponding to a row of pixels, and comparing the value assigned to each pixel with that of the preceding, or following, pixel in the row.

8. A method according to claim 6 in which the defined set of combination rules employed in the step of forming the combined image comprises comparing the two intensity change values obtained from the first and second images for each pixel, and selecting the value with the highest magnitude and assigning that to the corresponding pixel of the final image.

9. A method according to claim 6 in which the defined set of combination rules comprise squaring each intensity change value for a pixel and adding them together to form the magnitude of the value of the combined image, and applying a sign which depends on which of the two intensity change values has the highest magnitude.

10. A method according to claim 1 which further comprises processing the combined image to identify the boundaries of a highway.

11. A method according to claim 1 which comprises producing a combined image comprising values for each of the pixels in the initial image.

12. A method according to claim 1 in which the step of forming the first image comprises assigning values to each pixel which correspond to the value in the initial image where it is a pixel of the first set, and for the pixels which are in the second set assigning values which are obtained by interpolation from the values of one or more of the adjacent pixels of the first set.

13. A method according to claim 1 in which the step of forming the intermediate image comprises picking out only values for the second set and interpolating to fill any gaps.

14. An image processing apparatus for a vehicle comprising:

an imager arranged to capture an initial image of a region of a highway in front of the vehicle, the imager comprising a two dimensional array of image capturing pixels, the array comprising a first set of pixels located at spaced coordinates which each produce an output signal whose value is dependent on the lightness and not on the range of hues of the corresponding portion of the scene captured in the initial image interspersed with a second set of pixels which each produce an output signal having a value dependent on a limited range of hues of the corresponding portion of the scene captured in the initial image and dependent on the lightness of the corresponding portion of the scene captured in the initial image, and a processor that:

produces from the initial image a first image which is dependent on the lightness and not on the range of hues in the scene where each pixel in the first image is assigned a value derived using values from at least one pixel in the first set of pixels, produces from the initial image a second image, wherein for producing the second image, (a) an intermediate image is generated in which the value assigned to each pixel is obtained using the output from at least one pixel of the second set and independent of the values of the pixels of the first set and (b) one of the corresponding value assigned to the first image and the value assigned to the intermediate image is subtracted from the other one of those two values to form the values of the second image, wherein the first image, the second image, and the intermediate image are all derived from the initial image, identifies for at least one pixel in the first image a first intensity change value indicative of the difference between the value assigned to that pixel and the value assigned to at least one adjacent pixel, identifies a corresponding pixel in the second image a second intensity change value indicative of the difference between the value assigned to that pixel and the value assigned to at least one adjacent pixel, and forming a combined image by using a defined set of combination rules to assign a value to the corresponding pixel in the combined image which depends on the magnitude and/or sign of each of the first and second identified intensity change values for that corresponding pixel in the first and second images, the combined image being suitable for use in the lane detection apparatus.

15. An image processing apparatus according to claim 14 in which the imager is fixed to the vehicle and arranged to capture a series of initial images, each of which is processed to produce a respective series of combined images.

16. An image processing apparatus according to claim 14 which includes a memory, within which the images are stored temporarily.

17. An image processing apparatus according to claim 14 in which the imager comprises a video camera, which produces a stream of initial images, each of which is processed to form a respective stream of combined images.

18. An image processing apparatus according to claim 17 in which the video camera comprises a CCD array of detecting elements, with the pixels of the second set being covered by a filter.

19. A method of lane detection including the steps of claim 1 and the further step of processing the combined image to detect lane boundaries within the image.

20. A method of lane detection of claim 19 including a step of detecting lane boundaries based on the change of intensity in the combined image between adjacent pixels.

21. A method of lane detection of claim 20 wherein the step of forming a combined image includes using an edge detection algorithm to process the combined image.

* * * * *